United States Patent
Kanthamneni et al.

(10) Patent No.: US 8,059,526 B2
(45) Date of Patent: Nov. 15, 2011

(54) N+1 PROTECTION USING A PROCESSOR-BASED PROTECTION DEVICE

(75) Inventors: Vijayalakshmi Kanthamneni, Allentown, PA (US); Ravi Krishnaswamy, Stewartsville, NJ (US); Ning Li, Orefield, PA (US); Donna M. Nemshick, Weatherly, PA (US); Tim Reinhard, Bethlehem, PA (US); Steven Rothweiler, Bethlehem, PA (US); Robert L. Smigielski, Macungie, PA (US); Martin Trew, Wharton, NJ (US); Swaminathan Venkatakrishnaprasad, Waxhaw, NC (US); Wen N. Wang, Charlottesville, VA (US); Jay P. Wilshire, Pennsburg, PA (US)

(73) Assignee: LSI Corporation, Milpitas, CA (US)

(*) Notice: Subject to any disclaimer, the term of this patent is extended or adjusted under 35 U.S.C. 154(b) by 139 days.

(21) Appl. No.: 12/539,689

(22) Filed: Aug. 12, 2009

(65) Prior Publication Data
US 2010/0238794 A1  Sep. 23, 2010

Related U.S. Application Data

(60) Provisional application No. 61/162,409, filed on Mar. 23, 2009.

(51) Int. Cl.
*G01R 31/08* (2006.01)
(52) U.S. Cl. ........................ 370/217; 370/228
(58) Field of Classification Search .......... 370/218, 370/220, 400, 216
See application file for complete search history.

(56) References Cited

U.S. PATENT DOCUMENTS

| | | | |
|---|---|---|---|
| 6,901,047 B1 * | 5/2005 | Griffith et al. | 370/220 |
| 2003/0193890 A1 * | 10/2003 | Tsillas et al. | 370/216 |
| 2008/0259786 A1 * | 10/2008 | Gonda | 370/218 |
| 2010/0189114 A1 * | 7/2010 | Oishi et al. | 370/400 |

* cited by examiner

*Primary Examiner* — Kwang B Yao
*Assistant Examiner* — Syed M Bokhari
(74) *Attorney, Agent, or Firm* — Mendelsohn, Drucker & Associates, P.C.; Steve Mendelsohn (57) ABSTRACT

In an N+1 protection scheme for a router in a data or telecommunications network, a processor-based protection unit has a replica device handle, corresponding to each of the N working units, stored in the protection unit's local memory. Each replica device handle is an image of the connections provided by the corresponding working unit. In one implementation, upon detection of a failure of one of the working units, the router's controller unit sends a single command to instruct the protection unit to reconfigure itself using the corresponding locally stored replica device handle to assume the routing functions of the failed working unit.

9 Claims, 5 Drawing Sheets

N+1 PROTECTION USING A PROCESSOR-BASED PROTECTION DEVICE

CROSS-REFERENCE TO RELATED APPLICATIONS

This application claims the benefit of the filing date of U.S. provisional application No. 61/162,409, filed on Mar. 23, 2009 as the teachings of which are incorporated herein by reference in its entirety.

BACKGROUND

1. Field of the Invention

The present invention relates to data and telecommunications networks, and, in particular, to protection switching for such networks.

2. Description of the Related Art

The traditional approach for N+1 protection switching in a data or telecommunications network is achieved using a switching matrix that is agnostic to the type of connection being routed, and the protection switch is accomplished by reloading the switching matrix via direct writes to the controlling registers. Modern communication devices are typically processor based and rely on a command/response handshake to set up each connection. The command/response handshake dictates a serial process for setting up multiple connections and does not lend itself well to protection-switching applications where the timing requirements for the protection switch are typically of the order of tens of milliseconds. A conventional serial command/response method for protection switching would involve sending several hundred commands, which would take on the order of seconds to execute, a far greater time than is acceptable for a protection switch.

SUMMARY

In one embodiment, the present invention is a system comprising one or more working units, a processor-based protection unit, and a controller unit. Each working unit is configurable to provide a set of signal-routing connections. The processor-based protection unit is configurable to provide the set of signal-routing connections of any one of the working units. The controller unit detects failure of one of the working units and transmits a protection-switch command to the protection unit to make a protection switch. The protection unit comprises a multi-service processor (MSP) device, a local memory, and a programmable processor. The MSP device is configurable to provide signal-routing connections. The local memory stores, for each working unit, a replica device handle representing the set of signal-routing connections of the working unit. In response to receipt of the protection-switch command from the controller unit, the programmable processor causes (i) the replica device handle for the failed working unit to be retrieved from the local memory and (ii) the MSP device to be reconfigured based on the replica device handle to provide the set of signal-routing connections of the failed working unit.

In another embodiment, the present invention is the processor-based protection unit for the system described in the previous paragraph.

In yet another embodiment, the present invention is a method for the processor-based protection unit described in the previous paragraph. The method comprises storing, for each working unit, a replica device handle in a local memory of the protection unit, each replica device handle corresponding to the set of signal-routing connections of the working unit. Notice of failure of one of the working units is received and the replica device handle for the failed working unit is retrieved from the local memory. The protection unit is reconfigured to support the set of signal-routing connections of the failed working unit based on the retrieved replica device handle.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In an N+1 protection scheme, the protection unit has to be able to take on the functionality and configuration of any working unit during a protection switch. In one implementation, the protection unit contains a physical multi-service processor (MSP) device and a plurality of replica MSP devices, where each replica MSP device contains the buffered connection image (a.k.a. "replica device handle") of each working unit that the protection unit is protecting. When a protection switch occurs, the physical MSP device takes on the configuration of the replica MSP device corresponding to the failed working unit. According to certain embodiments of the present invention, in one single command-response handshake, the hundreds of existing connections on the physical MSP device are removed, and the buffered replica connections for the protected MSP device are then physically established. In order to allow a hierarchy of protection switching to occur, the protection unit's device manager can maintain a RAM copy for the active connections for the currently active physical MSP device.

Figure 1:
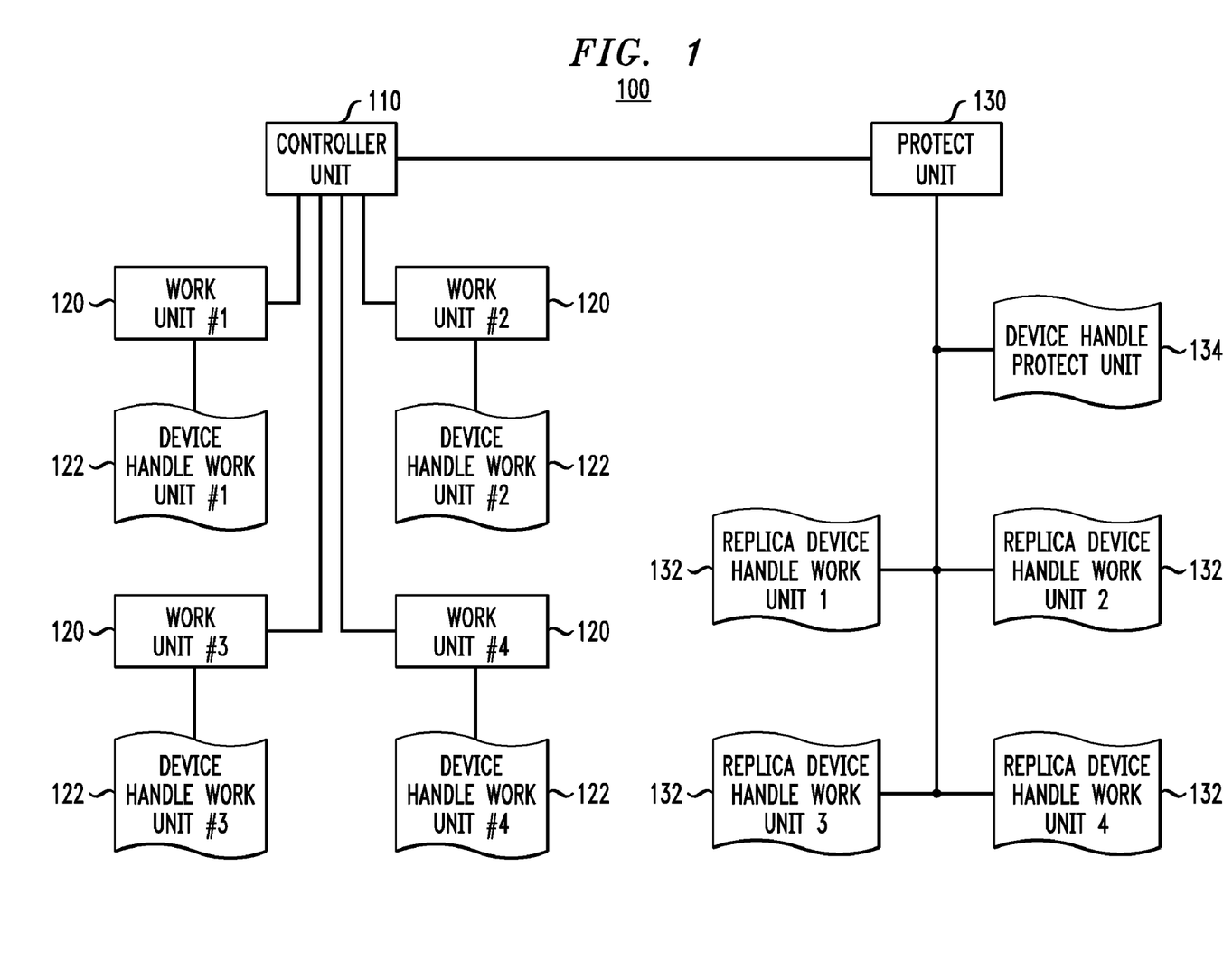
FIG. 1 shows a system-level block diagram of a router for a data or telecommunications network, according to one embodiment of the present invention.

FIG. 1 shows a simplified, system-level block diagram of a router 100 for a data or telecommunications network, according to one embodiment of the present invention. Router 100 has a controller unit 110, four processor-based working units 120, and a single, processor-based protection unit 130. Router 100 is configured in an N+1 protection-switching architecture, in which protection unit 130 provides failure protection for all four working units 120, under the control of controller unit 110.

As described in further detail below in conjunction with FIG. 2, protection unit 130 is a processor-based unit that includes an MSP device and a device manager that controls the operations of the MSP device. As used herein, the term "processor-based unit" implies that the unit's device manager is implemented using a programmable processor, such as a general-purpose microprocessor or a field-programmable gate array (FPGA), that can be programmed and reprogrammed with software and/or firmware to provide different sets of functions. This is different from a "hardware-based unit" whose MSP device is controlled by a non-programmable device manager, such as an application-specific integrated circuit (ASIC).

Note that the MSP devices of both hardware-based units and processor-based units can be configured and reconfigured to support different routing connections. This reconfigurability of the MSP device is different from the programmability of the device manager that controls the MSP device.

Each of working units 120 and protection unit 130 has an MSP device that can be programmed to route a particular set of incoming signals arriving at the MSP device inputs to a particular set of outgoing signals presented at the MSP device outputs. As represented in FIG. 1, each working unit 120 has a corresponding device handle 122, which represents the connections that need to be made within its MSP device to support the desired signal routing. For each device handle 122 of a working unit 120, protection unit 130 stores, in its local memory, a corresponding replica device handle 132.

Each replica device handle 132 is a buffered connection image that represents the same connections provided by the corresponding working unit 120. When a replica device handle 132 is created, global configuration parameters are copied from the controller-provided source device handle 122. Specific application programming interfaces (APIs) can be executed with an out-of-service replica device handle. A replica device handle contains a pointer to a block of RAM memory in order to support storing un-processed firmware commands.

The term "out-of-service" device handle is used herein to describe any device handle that is not currently directly servicing any active physical MSP device. The term "in-service" device handle is used herein to describe any device handle that is servicing a physical MSP device. For N+1 protection, "N" out-of-service replica device handles 132 are created on protection unit 130 to directly support the "N" working units.

In addition, protection unit 130 also has its own in-service device handle 134, which enables protection unit 130 to provide pre-failure routing of lower-priority signals.

If and when controller unit 110 determines that one of working units 120 has failed, controller unit 110 instructs protection unit 130 to reprogram itself to provide the signal routing previously provided by the now-failed working unit. In response, protection unit 130 retrieves the corresponding replica device handle 132 from its local memory to perform the appropriate MSP device reprogramming.

If and when controller unit 110 determines that the failed working unit 120 is ready to resume its signal routing, controller unit 110 can instruct protection unit 130 reprogram itself to resume its pre-failure routing of lower-priority signals. In response, protection unit 130 retrieves its own device handle 134 from its local memory to perform the appropriate MSP device reprogramming.

Each of replica device handles 132 is programmed to contain the database of the respective working unit's global configuration details and connection information. Each time a connection is created/deleted/modified on any working unit 120, controller unit 110 instructs protection unit 130 to update the corresponding replica device handle 132 on the protection unit. The application on protection unit 130 calls already-existing protocol specific APIs, but with the replica device handle that corresponds to the working unit. This keeps replica device handles 132 of the working units that reside on protection unit 130 in sync with the actual device handles 122 residing on the active working units 120. This synchronization is the responsibility of controller unit 110.

When calling APIs with out-of-service replica device handles, the command information is not sent to firmware. The command information is saved in pre-allocated RAM memory for use later.

When a protection switch occurs, one device handle (e.g., device handle 134) is taken out of service, and a replica device handle 132 is placed in service. The replica device handle, which already is configured with an image of the failed working unit's connection information (and global configuration information), switches state to become an in-service replica device handle. The firmware first executes a block delete to remove all existing connections from the MSP device, and then the connection-creation commands in RAM are executed to program the MSP device on the protection unit with the failed working unit's connection configuration.

With this solution, the MSP device manager execution overhead is removed, since the replica device handles are maintained and populated during normal operation, rather than at the instant a protection switch is needed. The primary overhead now becomes simply the firmware executing the connection-add commands that are already formulated in RAM memory.

This design also handles restoring the protection unit to its original state when the protection switch is undone. This design does not assume that the protection unit is not doing anything if it is not protecting any working unit. Such being the case, device handle 134 of the protection unit is a device handle that gets created with a state of in service since it is actively servicing an MSP device (i.e., the protection unit's MSP device). A block of RAM is allocated for firmware-connection commands associated with the protection unit when the protection unit is routing its own low-priority signals. When the protection switch is undone, the protection unit is re-configured to resume its activities.

Essentially all device handles on the protection unit are created as replica device handles so that the replica device handles can be switched in service and out of service, and commands will be available to the firmware to configure and reconfigure the MSP device to the desired state. It is the controller unit's responsibility to maintain synchronous working unit database and RAM images for each out-of-service, replica device handle on the protection unit. It is the MSP device manager's responsibility to maintain synchronous images of RAM for an in-service, replica device handle.

Figure 2:
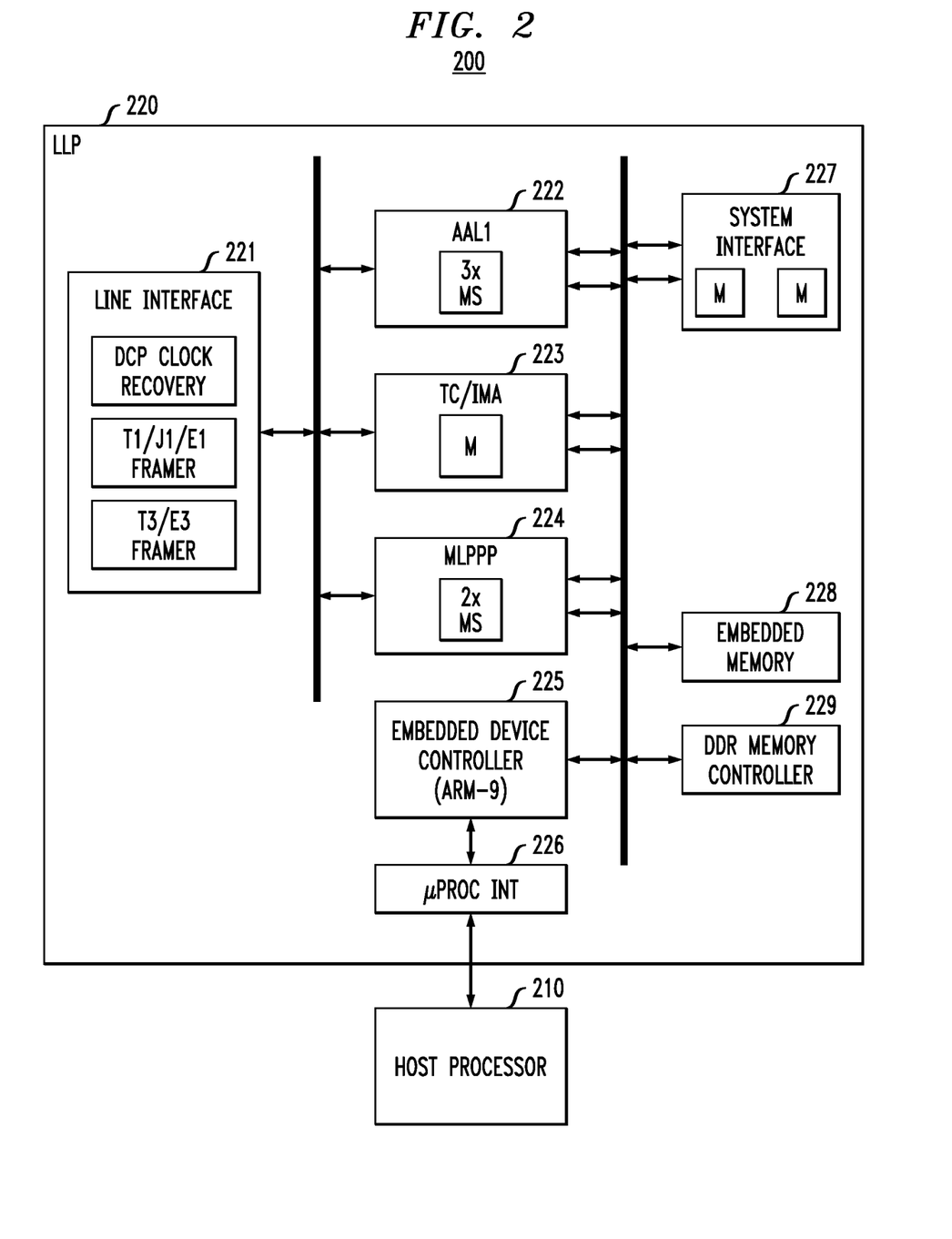
FIG. 2 shows a simplified hardware block diagram of a routing unit that can be used to implement each of the working units and the protection unit of FIG. 1.

FIG. 2 shows a simplified hardware block diagram of a routing unit 200 that can be used to implement each of working units 120 and protection unit 130 of FIG. 1. As shown in FIG. 2, routing unit 200 includes a host processor 210 and a MSP device 220. In one possible implementation, host processor 210 is a PowerPC 440 processor from Applied Micro Circuits Corporation of Sunnyvale, Calif., and MSP device 220 is a Link-Layer Processor (LLP) device from LSI Corporation of Milpitas, Calif.

MSP device 220 includes:
Line interface 221 which contains framers to provide the interface between the protocol blocks described below and the E1/T1 lines.
Asynchronous Transfer Mode (ATM) Adaptive Layer Type 1 (AAL1) module 222 which provides segmentation and reassembly of constant bit rate (CBR), synchronous, connection-oriented traffic.
Transmission Convergence/Inverse Multiplexing for ATM (TC/IMA) module 223 which is a standardized technology used to transport ATM traffic over a bundle of T1 or E1 links known as an IMA group.

Multi-Link Point-to-Point (MLPP) module 224 which is a standardized technology used to transport various encapsulated traffic types over a bundle of T1 or E1 links.

Embedded device controller 225 which provides for control and provisioning of the MSP device.

Microprocessor interface 226 which supports communications between MSP device 220 and host processor 210.

System interface 227 which provides the interface to a network processor or system field programmable gate array (FPGA) for traffic management.

Embedded RAM memory 228 which stores replica device handles 132 for the working units as well as device handle 134 for the protection unit;

Double data rate (DDR) memory controller 229 which controls the writing of data to embedded RAM memory 228 and the reading of data from embedded RAM memory 228.

Figure 3:
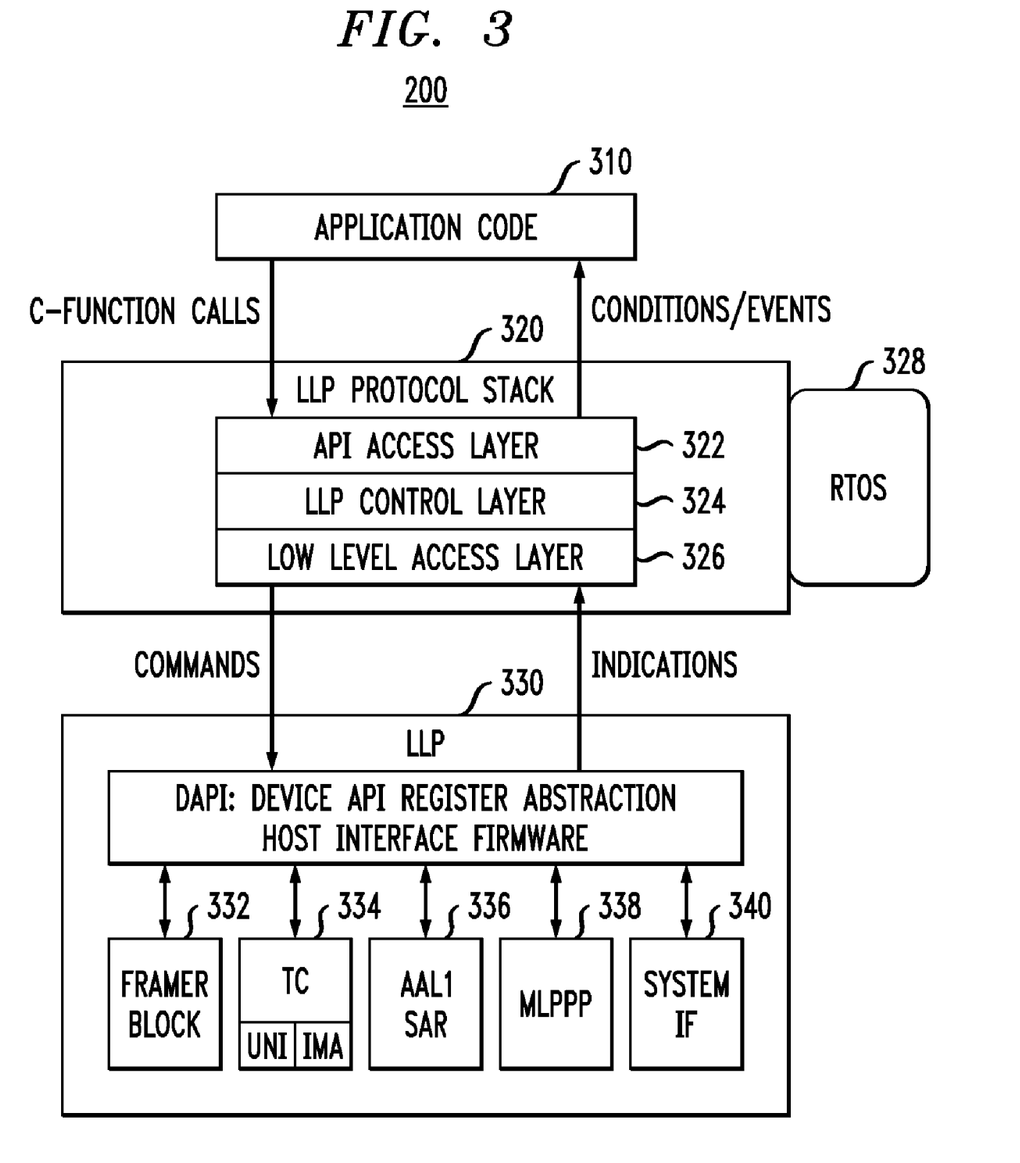
FIG. 3 shows a simplified software block diagram of the routing unit of FIG. 2.

FIG. 3 shows a simplified software block diagram of routing unit 200 of FIG. 2. As shown in FIG. 3, routing unit 200 has application code 310, MSP protocol stack 320, and MSP device API (DAPI) register abstraction host interface firmware 330. Application code 310, which runs on host processor 210, sends C-function calls to and receives conditions/events from MSP protocol stack 320, which runs on microprocessor interface 226. MSP protocol stack 320 sends commands to and receives indications from DAPI firmware 330, which runs on embedded device controller 225.

MSP protocol stack 320 includes:
API access layer 322 which provides a unified interface to application code 310 while hiding the details of the underlying hardware implementation.

MSP control layer 324 which takes the high-level commands provided by application code 310 and formulates them into low-level commands to pass to DAPI firmware 330.

Low-level access layer 326 which provides a platform-independent interface to MSP device 220.

Real-Time Operating System (RTOS) 328 which provides real-time tasking, interrupt support, and other hardware-management features for the software running on host processor 210.

DAPI firmware 330 includes:
Framer block 332 which is the firmware for operating line interface 221 of Fig B.

Transmission Convergence/Inverse Multiplexing for ATM (TC/IMA) 334 which is the firmware for operating TC/IMA 223 of FIG. 2.

AAL1 Segmentation And Reassembly (SAR) 336 which is the firmware for operating AAL1 222 of FIG. 2.

MLPP 338 which is the firmware for operating MLPP 224 of FIG. 2.

System IF 340 which is the firmware for operating system interface 227 of FIG. 2.

Figure 4:
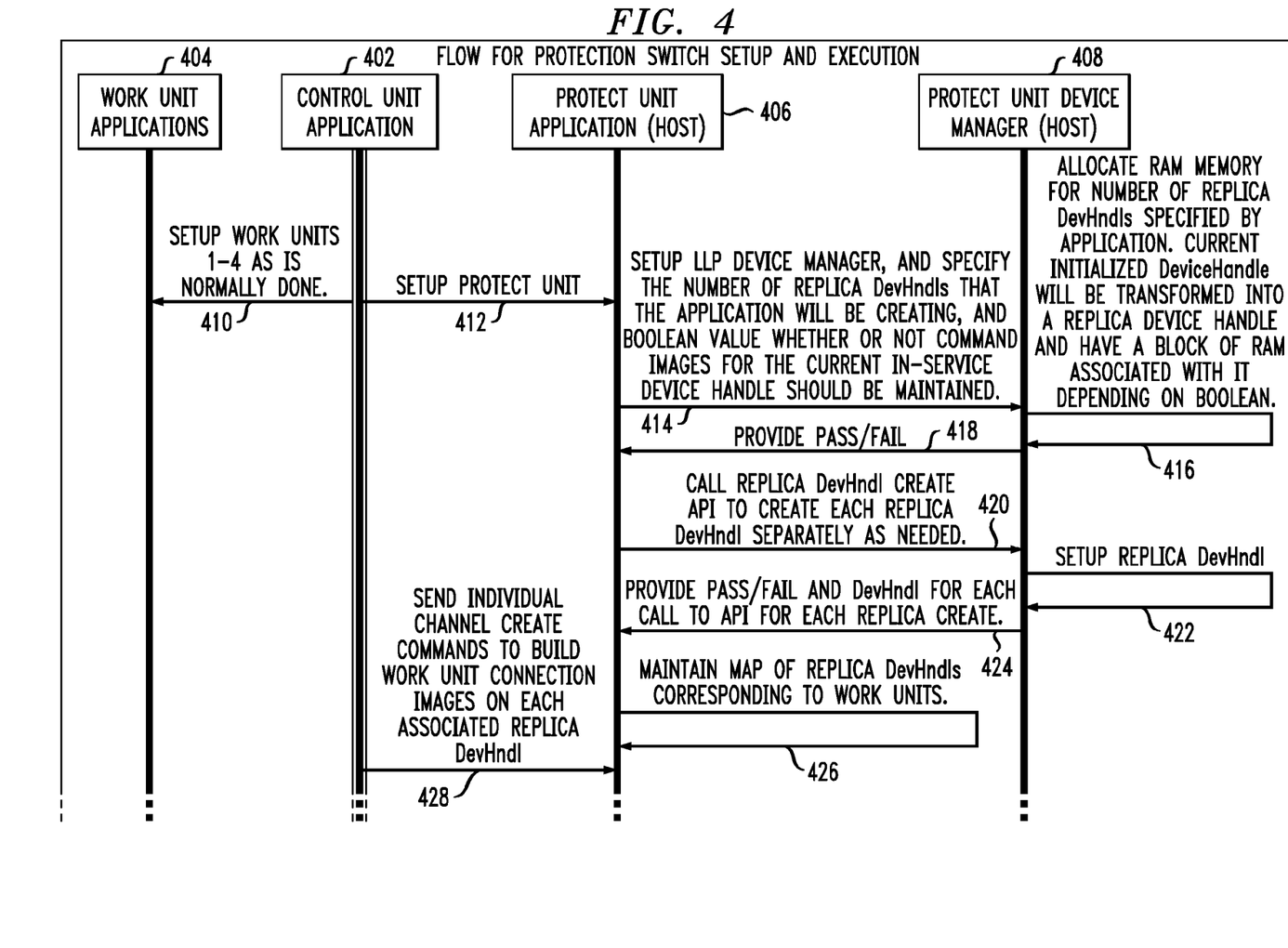
FIG. 4 shows a message-flow diagram for protection-switch setup and execution in the router of FIG. 1.

FIG. 4 shows a message-flow diagram for protection-switch setup and execution in router 100 of FIG. 1, where time flows from top to bottom in FIG. 4. In FIG. 4:

Controller unit (CU) application 402 represents the application-level software running on controller unit 110 of FIG. 1;

Working unit (WU) applications 404 collectively represent the application-level software running on the four working units 120 of FIG. 1;

Protection unit (PU) application 406 represents the application-level software running on host processor 210 of FIG. 2 when routing unit 200 is used to implement protection unit 130 of FIG. 1; and PU device manager 408 represents the MSP device-manager software running on host processor 210 of FIG. 2 when routing unit 200 is used to implement protection unit 130 of FIG. 1.

Note that PU application 406 and PU device manager 408 are represented collectively in FIG. 3 as application code 310. In FIG. 4, arrows 410-436 represent communications and actions associated with protection-switch setup, while arrows 438-446 represent communications and actions associated with protection-switch execution.

In particular, the processing of FIG. 4 begins with CU application 402 sending commands 410 and 412 instructing WU applications 404 and PU application 406 to configure working units 120 and protection unit 130, respectively, for normal operations. As described earlier, working units 120 respond by configuring their respective MSP devices to support the signal routing dictated by their respective device handles 122. In FIG. 4, arrow 410 represents all of the communications between CU application 402 and WU applications 404 involved in configuring working units 120 for normal operations. Similarly, arrows 412 and 428 represent all of the communications between CU application 402 and PU application 406 involved in configuring protection unit 130 for normal operations.

In response to command(s) 412, PU application 406 sends command(s) 414 to PU device manager 408 to set up the device manager implemented by host processor 210. This includes specifying (i) the number of replica device handles 132 that will be stored in protection unit 130 and (ii) an optional boolean value that indicates whether or not command images for the current in-service device handle 134 should be maintained (i.e., whether or not protection unit 130 needs to save a device handle corresponding to its own current pre-failure routing configuration). If the boolean value is not implemented, then protection unit 130 will always save a device handle corresponding to its own current pre-failure routing configuration.

In response (416) to command(s) 414, PU device manager 408 allocates random access memory (RAM) for the specified number of replica device handles 132 and, if dictated by the specified boolean value, allocates RAM for a device handle 134 corresponding to its pre-failure signal-routing configuration. PU device manager 408 sends message 418 to PU application 406 confirming whether or not the device manager was set up properly.

Assuming that the device manager was properly set up, PU application 406 sends command(s) 420 to PU device manager 408 to create each replica device handle 132 as needed. In response, PU device manager 408 sets up (422) each replica device handle 132 and sends message(s) 424 confirming whether or not each replica device handle 132 was created properly. Assuming that each replica device handle 132 was properly created, PU application 406 maintains (426) a mapping of replica device handles 132 corresponding to the different working units 120.

For each signal-routing channel of each working unit 120, CU application 402 sends command(s) 428 to PU application 406 identifying the channel, and PU application 406 sends corresponding command(s) 430 to PU device manager 408, which responds by (i) storing (432) that channel information in the appropriate replica device handle 132 in embedded RAM memory 228 of FIG. 2 and (ii) sending message(s) 434 (a) confirming whether or not the channel was stored properly and (b) providing PU application 406 with a connection handle for the channel. PU application 406 maintains (436) mappings of the connection handles for the different channels in the different working units 120.

If and when a working unit 120 fails, CU application 402 detects that event, either by receiving an explicit failure message 438 from the failed working unit 120 or via some other means (e.g., failure to receive an expected message from the failed working unit 120 within a specified amount of time). Note that it cannot be assumed that controller unit 110 can communicate with a working unit 120 at the time that the working unit is faulty. In response, CU application 402 sends command 440 to PU application 406 informing PU application 406 that the particular working unit 120 has failed. In response, PU application 406 sends command 442 to PU device manager 408 for the device manager to reconfigure MSP device 220 based on the corresponding replica device handle 132 stored in embedded RAM memory 228. In response (444), PU device manager 408 controls MSP device 220 to be reconfigured based on that retrieved replica device handle 132. This involves calling the MSP firmware to remove the current channel configuration and create the appropriate new channels. PU device manager 408 sends message(s) 446 to PU application 406 confirming whether or not the protection switch was completed properly.

Because the replica device handles 132 were previously stored in the protection unit's memory 228, in certain embodiments of the present invention, only a single command (i.e., command 440) is required to be transmitted from CU application 402 to PU application 406 to implement a protection switch. This compares with certain prior-art embodiments that require, after the failure of a working unit, an individual command to be transmitted from the controller unit to the protection unit for each channel connection of the failed working unit. In certain implementations, the ability to implement protection-switching with only a single command represents a protection-switch execution-time improvement of two orders of magnitude from seconds down to 10 s of milliseconds.

Note that, prior to failure of a working unit and the corresponding protection switch, the sets of connection commands represented in replica device handles 132 stored in the protection unit's embedded memory 228, can be modified at any time up to the actual protection switch to mirror dynamically the tear-down and set-up of connections in the working units.

In one possible implementation, all of the working units 120 have the same priority level. In that case, protection unit 130 is able to assume the routing functions of the working unit that fails first. If another working unit fails before the first-failed working unit is able to resume its functions, then no protection switching will be available for the second-failed working unit. In another possible implementation, the working units 120 have different priority levels. In that case, if the second-failed working unit has a higher priority level than the first-failed working unit, then the protection unit can be commanded to switch from providing the routing functions of the first-failed, lower-priority working unit to providing the routing functions of the second-failed, higher-priority working unit.

In one possible N+1 protection switch architecture, the MSP global device configurations of the protection unit and all "N" working units are identical. Nevertheless, the connection configuration is unique for each of the working units.

Although the present invention has been described in the context of a router having four working units protected by a single protection unit, the invention is not so limited. In general, the present invention can be implemented in the context of any suitable number of working units and any suitable number of protection units in a router or other suitable type of network node.

The present invention has been described in the context of a router having processor-based working units and a processor-based protection unit. In alternative embodiments, one or more or even all of the working units can be hardware-based units.

The present invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

What is claimed is:

1. A system (e.g., 100) comprising:
two or more working units including a first working unit and a second working unit, each working unit configurable to provide a set of signal-routing connections;
a processor-based protection unit configurable to provide the set of signal-routing connections of any one of the working units; and
a controller unit that detects failure of one of the working units and transmits a protection-switch command to the protection unit to make a protection switch, wherein the protection unit comprises:
a multi-service processor (MSP) device configurable to provide signal-routing connections;
a local memory configurable to store, for each working unit, a replica device handle representing the set of signal-routing connections of the working unit including (i) a first replica device handle representing the set of signal-routing connections of the first working unit and (ii) a second replica device handle representing the set of signal-routing connections of the second working unit; and
a programmable processor that, in response to receipt of the protection-switch command from the controller unit, causes (i) the replica device handle for the failed working unit to be retrieved from the local memory and (ii) the MSP device to be reconfigured based on the replica device handle to provide the set of signal-routing connections of the failed working unit, such that:
if the failed working unit is the first working unit, then the programmable processor, in response to receipt of the protection-switch command from the controller unit, causes (i) the first replica device handle for the failed first working unit to be retrieved from the local memory and (ii) the MSP device to be reconfigured based on the first replica device handle to provide the set of signal-routing connections of the failed first working unit; and
if the failed working unit is the second working unit, then the programmable processor, in response to receipt of the protection-switch command from the controller unit, causes (i) the second replica device handle for the failed second working unit to be retrieved from the local memory and (ii) the MSP device to be reconfigured based on the second replica device handle to provide the set of signal-routing connections of the failed second working unit.

2. The invention of claim 1, wherein:
prior to the failure of the working unit, the protection unit is configured to support a set of protection-unit signal-routing connections; and
the local memory stores a protection-unit device handle for the set of protection-unit signal-routing connections, such that, upon recovery from the failure of the working unit, the protection-unit device handle is retrieved from the local memory and used to reconfigure the MSP device to support the set of protection-unit signal-routing connections.

3. The invention of claim 1, wherein, upon detection of the failed working unit, the controller unit transmits only the single protection-switch command to the protection unit to make the protection switch.

4. A processor-based protection unit for a system, wherein the system further comprises two or more working units, including a first working unit and a second working unit, and a controller unit, each working unit configurable to provide a set of signal-routing connections, the controller unit detecting failure of one of the working units and transmitting a protection-switch command to the protection unit to make a protection switch, wherein the protection unit is configurable to provide the set of signal-routing connections of any one of the working units, the protection unit comprising:
a multi-service processor (MSP) device configurable to provide signal-routing connections;
a local memory configurable to store, for each working unit, a replica device handle representing the set of signal-routing connections of the working unit including a first replica device handle representing the set of signal-routing connections of the first working unit and a second replica device handle representing the set of signal-routing connections of the second working unit; and
a programmable processor that, in response to receipt of the protection-switch command from the controller unit, causes (i) the replica device handle for the failed working unit to be retrieved from the local memory and (ii) the MSP device to be reconfigured based on the replica device handle to provide the set of signal-routing connections of the failed working unit, such that:
if the failed working unit is the first working unit, then the programmable processor, in response to receipt of the protection-switch command from the controller unit, causes (i) the first replica device handle for the failed first working unit to be retrieved from the local memory and (ii) the MSP device to be reconfigured based on the first replica device handle to provide the set of signal-routing connections of the failed first working unit; and
if the failed working unit is the second working unit, then the programmable processor, in response to receipt of the protection-switch command from the controller unit, causes (i) the second replica device handle for the failed second working unit to be retrieved from the local memory and (ii) the MSP device to be reconfigured based on the second replica device handle to provide the set of signal-routing connections of the failed second working unit.

5. The invention of claim 4, wherein:
prior to the failure of the working unit, the protection unit is configured to support a set of protection-unit signal-routing connections; and
the local memory stores a protection-unit device handle for the set of protection-unit signal-routing connections, such that, upon recovery from the failure of the working unit, the protection-unit device handle is retrieved from the local memory and used to reconfigure the MSP device to support the set of protection-unit signal-routing connections.

6. The invention of claim 4, wherein, upon detection of the failed working unit, the controller unit transmits only the single protection-switch command to the protection unit to make the protection switch.

7. A machine-implemented method for a processor-based protection unit in a system comprising (i) two or more working units, including a first working unit and a second working unit, each working unit configurable to provide a set of signal-routing connections, (ii) the processor-based protection unit configurable to provide the set of signal-routing connections of any one of the working units, and (iii) a controller unit that detects failure of one of the working units and transmits a protection-switch command to the protection unit to make a protection switch, the method comprising:

storing, for each working unit, a replica device handle in a local memory of the protection unit, each replica device handle corresponding to the set of signal-routing connections of the working unit including a first replica device handle representing the set of signal-routing connections of the first working unit and a second replica device handle representing the set of signal-routing connections of the second working unit;

receiving notice of failure of one of the working units;

retrieving the replica device handle for the failed working unit from the local memory; and     reconfiguring the protection unit to support the set of signal-routing connections of the failed working unit based on the retrieved replica device handle, such that:

if the failed working unit is the first working unit, then, in response to receipt of notice of the failure of the first working unit, (i) the first replica device handle for the failed first working unit is retrieved from the local memory and (ii) the MSP device is reconfigured based on the first replica device handle to provide the set of signal-routing connections of the failed first working unit; and         if the failed working unit is the second working unit, then, in response to receipt of notice of the failure of the second working unit, (i) the second replica device handle for the failed second working unit is retrieved from the local memory and (ii) the MSP device is reconfigured based on the second replica device handle to provide the set of signal-routing connections of the failed second working unit.

8. The invention of claim 7, wherein:

prior to the failure of the working unit, the protection unit is configured to support a set of protection-unit signal-routing connections; and the local memory stores a protection-unit device handle for the set of protection-unit signal-routing connections, such that, upon recovery from the failure of the working unit, the protection-unit device handle is retrieved from the local memory and used to reconfigure the MSP device to support the set of protection-unit signal-routing connections.

9. The invention of claim 7, wherein, upon detection of the failed working unit, the protection unit receives only the single protection-switch command from controller unit to make the protection switch.

* * * * *

UNITED STATES PATENT AND TRADEMARK OFFICE
CERTIFICATE OF CORRECTION

| | |
|---|---|
| PATENT NO. | : 8,059,526 B2 |
| APPLICATION NO. | : 12/539689 |
| DATED | : November 15, 2011 |
| INVENTOR(S) | : Vijayalakshmi Kanthamneni et al. |

It is certified that error appears in the above-identified patent and that said Letters Patent is hereby corrected as shown below:

- On the title page, in Inventors (75), please replace "Wen N. Wang" with -- Wen Wang --.

Signed and Sealed this
Eighth Day of May, 2012

David J. Kappos
*Director of the United States Patent and Trademark Office*